United States Patent [19]
Trevett

[11] Patent Number: 5,459,835
[45] Date of Patent: Oct. 17, 1995

[54] GRAPHICS RENDERING SYSTEMS

[75] Inventor: Neil F. Trevett, Surrey, United Kingdom

[73] Assignee: 3D Labs Ltd., Egham, United Kingdom

[21] Appl. No.: 996,911

[22] Filed: Dec. 28, 1992

Related U.S. Application Data

[63] Continuation of PCT/GB90/00987, Jun. 26, 1990

[51] Int. Cl.⁶ ................................................. G06F 15/16
[52] U.S. Cl. ............................................ 395/163; 395/164
[58] Field of Search .................................. 395/157–158, 395/162–166, 425; 345/119–120, 185, 201, 203

[56]    References Cited

U.S. PATENT DOCUMENTS

| | | | |
|---|---|---|---|
| 4,209,832 | 6/1980 | Gilham et al. | 364/900 |
| 4,737,921 | 4/1988 | Goldwasser et al. | 395/163 |
| 5,276,788 | 1/1994 | Stapleton | 395/164 |

FOREIGN PATENT DOCUMENTS

| | | | |
|---|---|---|---|
| 0310176 | 4/1989 | European Pat. Off. | G06F 15/72 |
| 0321095 | 6/1989 | European Pat. Off. | G06F 15/72 |

*Primary Examiner*—Mark R. Powell
*Assistant Examiner*—Kee M. Tung
*Attorney, Agent, or Firm*—Robert Groover; Betty Formby

[57]    ABSTRACT

In a 2-D graphics rendering system having a plurality of processors (PROC 0 to PROC 3) which receive instructions from a common instruction register (IR) and render polygons in a framestore (FS), in order to permit asynchronous performance of the instructions and yet ensure that overlapping polygons are properly rendered, each instruction includes an ordering code, and before writing a pixel to the framestore (FS) each processor checks that the ordering code of the polygon it is rendering is more significant than an ordering code for that pixel stored in an ordering buffer in which case the pixel is written to the framestore (FS) and the order buffer (OB) is updated, but if not the pixel is not written.

5 Claims, 4 Drawing Sheets

| STEP | PROC | INSTR-UCTION | LOCATION (x,y) | CURRENT ORDER CO ← OB(x,y) | POLYGON COLOUR PC | POLYGON ORDER PO | RENDER? PO > CO? | NEW COLOUR → FS(x,y) | NEW ORDER → OB(x,y) |
|---|---|---|---|---|---|---|---|---|---|
| 1 | 0 | a | (1,1) | 0 | Black | 1 | Yes | Black | 1 |
| 2 | 1 | b | (1,4) | 0 | Red | 2 | Yes | Red | 2 |
| 3 | 2 | c | (2,2) | 0 | Green | 3 | Yes | Green | 3 |
| 4 | 3 | d | (4,1) | 0 | Cyan | 4 | Yes | Cyan | 4 |
| 5 | 0 | a | (2,1) | 0 | Black | 1 | Yes | Black | 1 |
| 6 | 1 | b | (2,4) | 0 | Red | 2 | Yes | Red | 2 |
| 7 | 2 | c | (3,2) | 0 | Green | 3 | Yes | Green | 3 |
| 8 | 3 | d | (5,1) | 0 | Cyan | 4 | Yes | Cyan | 4 |
| 9 | 0 | a | (3,1) | 0 | Black | 1 | Yes | Black | 1 |
| 10 | 1 | b | (1,5) | 0 | Red | 2 | Yes | Red | 2 |
| 11 | 2 | c | (4,2) | 0 | Green | 3 | Yes | Green | 3 |
| 12 | 3 | d | (4,2) | 3 | Cyan | 4 | Yes | Cyan | 4 |
| 13 | 0 | a | (4,1) | 4 | Black | 1 | No | | |
| 14 | 1 | b | (2,5) | 0 | Red | 2 | Yes | Red | 2 |
| 15 | 2 | c | (2,3) | 0 | Green | 3 | Yes | Green | 3 |
| 16 | 3 | d | (5,2) | 0 | Cyan | 4 | Yes | Cyan | 4 |
| 17 | 0 | a | (5,1) | 4 | Black | 1 | No | | |
| 18 | 1 | e | (4,4) | 0 | Yellow | 5 | Yes | Yellow | 5 |
| 19 | 2 | c | (3,3) | 0 | Green | 3 | Yes | Green | 3 |
| 20 | 0 | a | (1,2) | 0 | Black | 1 | Yes | Black | 1 |
| 21 | 1 | e | (4,5) | 0 | Yellow | 5 | Yes | Yellow | 5 |
| 22 | 2 | c | (4,3) | 0 | Green | 3 | Yes | Green | 3 |
| 23 | 0 | a | (2,2) | 3 | Black | 1 | No | | |
| 24 | 2 | c | (2,4) | 2 | Green | 3 | Yes | Green | 3 |
| 25 | 0 | a | (2,2) | 3 | Black | 1 | No | | |
| 26 | 2 | c | (2,4) | 2 | Green | 3 | Yes | Green | 3 |
| 27 | 0 | a | (2,2) | 3 | Black | 1 | No | | |
| 28 | 2 | c | (2,4) | 2 | Green | 3 | Yes | Green | 3 |
| 29 | 0 | a | (5,2) | 4 | Black | 1 | No | | |
| 30 | 0 | a | (1,3) | 0 | Black | 1 | Yes | Black | 1 |
| 31 | 0 | a | (2,3) | 3 | Black | 1 | No | | |
| 32 | 0 | a | (3,3) | 3 | Black | 1 | No | | |
| 33 | 0 | a | (4,3) | 3 | Black | 1 | No | | |
| 34 | 0 | a | (5,3) | 0 | Black | 1 | Yes | Black | 1 |
| 35 | 0 | a | (1,4) | 2 | Black | 1 | No | | |
| 36 | 0 | a | (2,4) | 3 | Black | 1 | No | | |
| 37 | 0 | a | (3,4) | 3 | Black | 1 | No | | |
| 38 | 0 | a | (4,4) | 5 | Black | 1 | No | | |
| 39 | 0 | a | (5,4) | 0 | Black | 1 | Yes | Black | 1 |
| 40 | 0 | a | (1,5) | 2 | Black | 1 | No | | |
| 41 | 0 | a | (2,5) | 2 | Black | 1 | No | | |
| 42 | 0 | a | (3,5) | 0 | Black | 1 | Yes | Black | 1 |
| 43 | 0 | a | (4,5) | 5 | Black | 1 | No | | |
| 44 | 0 | a | (5,5) | 0 | Black | 1 | Yes | Black | 1 |

*FIG. 4*

GRAPHICS RENDERING SYSTEMS

CROSS REFERENCE TO RELATED APPLICATIONS

This application claims priority from PCT/GB90/00987, filed Jun. 26, 1990, under 35 USC 120.

This invention relates to graphics rendering systems.

A simple 2-D graphics rendering system may comprise a graphics processor which receives a stream of rendering instructions from a host computer, and renders the graphical shapes or polygons defined by the instructions one-by-one in a framestore. A video processor reads out the data from the framestore and displays it on a monitor. If it is desired to display, say, a small red triangle on a large green triangle, this can be simply accomplished by supplying the instruction to render the large green triangle before the instruction to render the small red triangle. The large green triangle is rendered in the framestore first, and then when the red triangle is rendered, it partially overwrites the large green triangle, producing the desired effect.

In order to increase rendering speed, it is desirable to provide a plurality of processors, which can share the rendering operations between them. Overlapping of polygons then becomes a problem. In the example given above, if two processors are rendering the large green and small red triangles, respectively, at the same time, it is quite possible that some pixels of the green triangle in the area of desired overlap by the red triangle will be rendered green by one processor after those pixels have been rendered red by the other processor, thus resulting in parts of the required red triangle being green. In order to overcome this problem, it may be considered expedient to provide with each instruction an order code, so that the order codes indicate the order in which the polygons need to be rendered to prevent any possibility of incorrect overlap. Each processor would then be operable to determine, before rendering a polygon, whether that polygon overlaps with any other polygon which has an earlier order code and which is still to be rendered, and if so, the processor would wait until rendering of the polygon with the earlier order code was complete. In the simple example given above, the processor which is to render the small red triangle would wait until the other processor had completed rendering the large green triangle. Although this overcomes the overlap problem, it will be appreciated that, in this simple example, the two triangles are rendered sequentially, rather than simultaneously. This, combined with the time taken for each processor to check whether the other processor is still rendering an earlier overlapping polygon, will result in the two-processor system taking longer to render the two triangles than the single processor system.

The present invention aims to overcome the above problem by providing a memory in parallel with the framestore which stores, for each pixel location in the framestore, the order code of the graphical shape or polygon to which the pixel currently rendered at that pixel location belongs. In determining whether to write to a pixel location in the framestore, each processor can check whether the order code of the shape it is rendering is later than the stored order code in the memory (in which case it writes that pixel), or not (in which case it does not write that pixel). Accordingly, there is no limitation on the order in which the processors can render the polygons, and the problem of erroneous overwriting is overcome.

It is known, in 3-D graphics rendering using a single rendering processor, to provide a memory in parallel with the framestore which stores, for each X, Y pixel location in the framestore, the depth Z of the pixel currently written to that location. In determining whether to write to an X,Y pixel location in the framestore, the processor checks whether the depth (obtained by interpolation) of the pixel to be rendered is less than the depth stored in the memory (in which case it writes that pixel), or not (in which case it does not write that pixel). There is thus some degree of similarity between this known depth-buffered 3-D graphics rendering system and the order-buffered 2-D graphics rendering system of the present invention. It should be noted, however, that with the present invention the comparison is made in a 2-D system by each of a plurality of processors between the additional stored data and the order of the shape (or polygon) being rendered, rather than the depth of a pixel in the shape (or polygon) being rendered, as in the known single processor 3-D depth buffered system.

BRIEF DESCRIPTION OF THE DRAWING

There now follows a description, by way of example, of a specific embodiment of the present invention, with reference to the accompanying drawings, in which:

FIG. 4 is a table of steps carried out in rendering a series of instructions to produce the framestore content as shown in FIG. 2.

DETAILED DESCRIPTION

Figure 1:
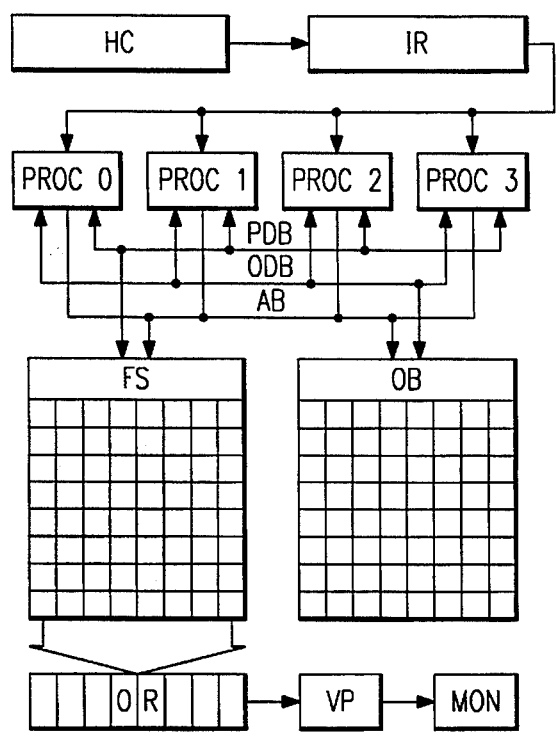
FIG. 1 is a schematic circuit diagram of the rendering system.

Referring to FIG. 1, in the preferred embodiment, a host computer HC supplies a set of rendering instructions to an instruction register IR. The instructions take the form of: (i) an opcode representing instructions such as draw a rectangle (represented hereinafter by the mnemonic "rec"); draw a triangle or clear the screen; (ii) parameters associated with the opcode, such as the coordinates of two opposite corners (x1, y1), (x2, y2) of the rectangle, or the coordinates of the vertices (x1, y1), (x2, y2) and (x3, y3) of the triangle, together with a colour code indicating the colour of, for example, the rectangle or triangle or the colour to which the screen is to be cleared; and (iii) the order of the instruction. In the example given in this description the following set of rendering instructions will be considered:

rec 1, 1, 5, 5, Black, 1-(a)

rec 1, 4, 2, 5, Red, 2-(b)

rec 2, 2, 4, 4, Green, 3-(c)

rec 4, 1, 5, 2, Cyan, 4-(d)

rec 4, 4, 4, 5, Yellow, 5-(e)

The meaning of these instructions is as follows:

a: render a black rectangle with corner coordinates (1, 1) and (5, 5);

b: render a red rectangle with corner coordinates (1, 4) and (2, 5) so that it is not hidden by any pixels rendered in instruction a;

c: render a green rectangle with corner coordinates (2, 2) and (4, 4) so that it is not hidden by any pixels rendered in instruction a or b;

d: render a cyan rectangle with corner coordinates (4, 1) and (5, 2) so that it is not hidden by any pixels rendered in instructions a to c; and e: render a yellow rectangle with corner coordinates (4, 4) and (4, 5) so that it is not hidden by any pixels rendered in instructions a to d.

Referring back to FIG. 1, in the preferred embodiment, the rendering system further comprises four processors PROC 0 to PROC 3, a framestore FS with associated output register OR, an ordering buffer OB, a video processor VP and a monitor MON. The processors can read instructions from the instruction register IR asynchronously, so that, for example, processor PROC 0 can read and perform more than one simple instruction, while processor PROC 1 is performing a single more complex instruction. The processors PROC 0 to PROC 3 are each operable to address the framestore FS and the ordering buffer OB with the same address on an address bus AB. The processors PROC 0 to PROC 3 are also each operable to read and write data to the framestore FS and the ordering buffer OB via a pixel data bus PDB and an ordering data bus ODB, respectively. The framestore FS and ordering buffer OB have the same capacity, which is shown in FIG. 1 for simplicity as merely 8×8 words, and by virtue of the common addressing of the framestore FS and the ordering buffer OB by the address bus AB, each location in the framestore FS is associated with a respective location in the ordering buffer. As is conventional, the output register OR of the framestore FS is loaded row-by-row in parallel with pixel data from the framestore FS, and the pixel data for each row is output serially from the output register OR to the video processor VP for display on the monitor MON.

Figure 3:
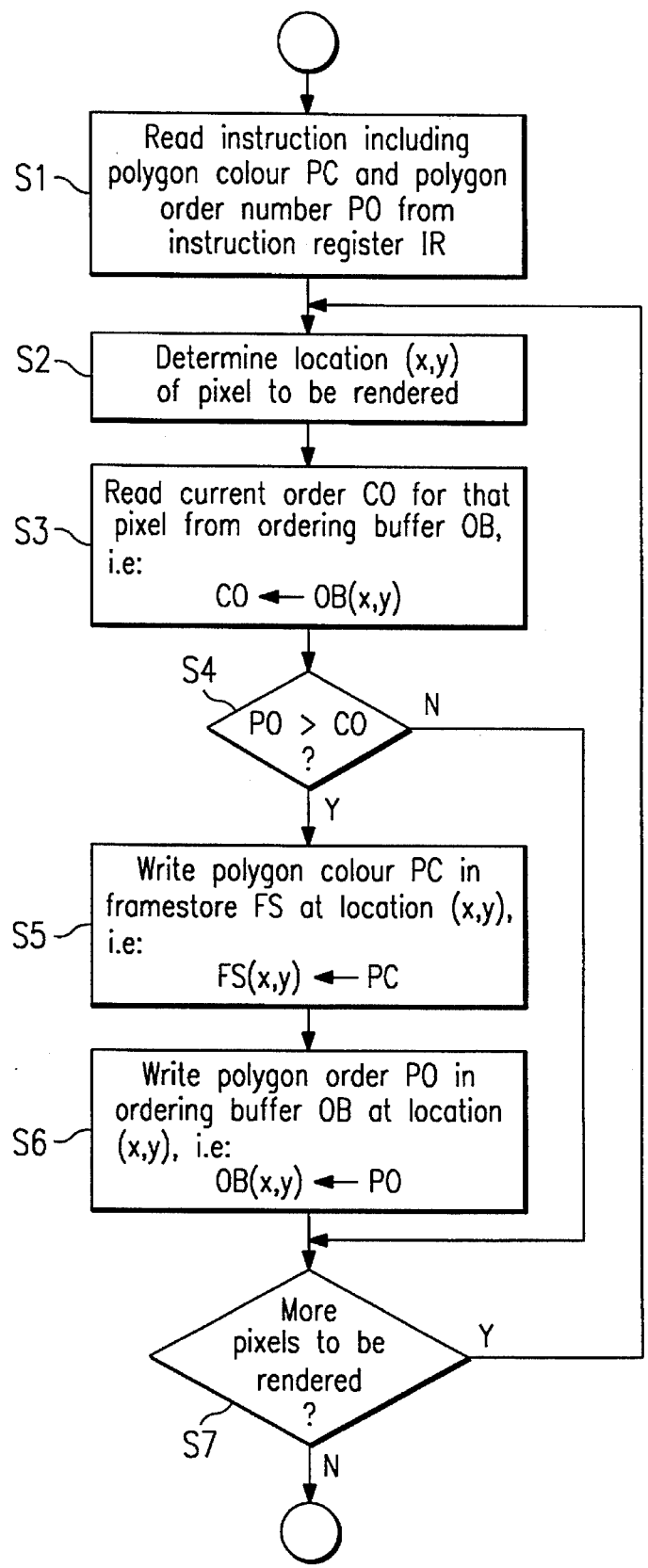
FIG. 3 is a flow diagram of the operation of each of the processors of FIG. 1 in executing a rendering instruction.

In the preferred embodiment, in carrying out an instruction, the processors PROC 0 to PROC 3 each perform the sequence of steps shown in FIG. 3. In the first step S1, a processor reads an instruction including the polygon colour PC and polygon order number PC from the instruction register IR. For example, considering instruction "a" above, the processor reads the instruction "rec 1, 1, 5, 5" and sets PC= Black and PO= 1. In the preferred embodiment, an exclusion lock is provided so that only one processor at a time may read an instruction from the instruction register. Next, in step S2, the processor determines, in a known manner, the location of a first pixel to be rendered, such as, in this example, (1, 1). Then in step S3, the processor addresses the ordering buffer OB (and the framestore FS) with the location (x, y), and sets a current order variable CO equal to the order number OB (x, y) at that location. Then, in step the processor determines whether the polygon order PO for the polygon of the instruction being processed is greater than the current order CO read from the order buffer OB. If so, then in step S5, the processor writes the polygon colour PC of the instruction being processed to the framestore FS at the addressed location (x, y), and in step 6 writes the polygon order PC of the instruction being processed to the ordering buffer OB at the addressed location (x, y). Thus, the pixel is written, and the ordering buffer OB is updated. Step S7 then follows. If, in step S4, it is determined that the polygon order PC is not greater than the stored current order CO, then steps S5 and S6 are skipped, and accordingly the pixel is not written and the ordering buffer is not updated. In the preferred embodiment, an exclusion lock is provided so that only one processor at a time can be addressing the framestore FS and the ordering buffer OB in step S3, S5 or 56. Also, once a processor has addressed the framestore FS and ordering buffer OB in step S3, it places a scan line lock on the framestore and ordering buffer until either it has completed step S6 or it has been determined in step S4 not to write to the framestore and ordering buffer. The scan line lock prevents any other processor accessing a location in the framestore and ordering buffer with the same "y" address, and thus prevents any other processor changing the content of OB (x,y) which has been read by the processor in question at step S3, whilst still enabling the other processors to access addresses with different "y" addresses. In step S7, the processor determines in a known manner, whether any more pixels need to be rendered to complete the polygon, and if so, the sequence loops back to step S2, where the next pixel is considered. If, however, rendering of the polygon is complete, then the sequence is finished, and the processor is ready to read another instruction from the instruction register IR.

Figure 5A:
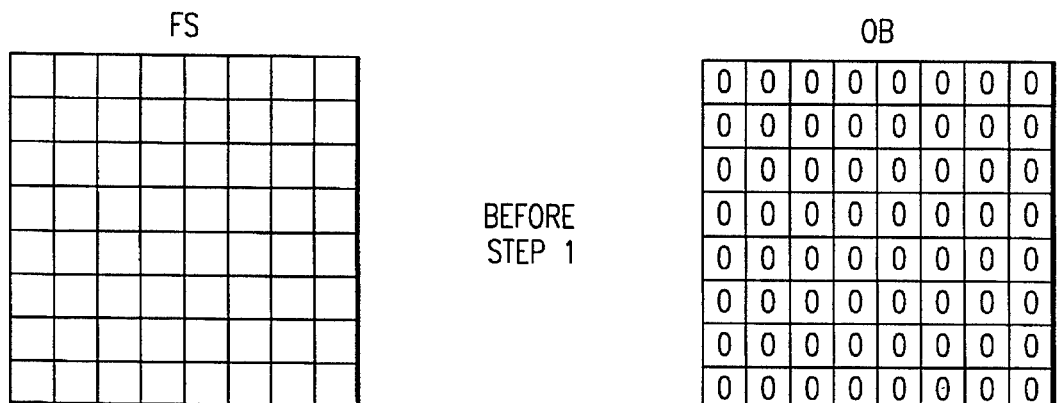
FIG. 5A to 5C show the contents of the framestore and ordering buffer before the series of instructions is commenced at two occasions part-way through the series of instructions.
Figure 5B:
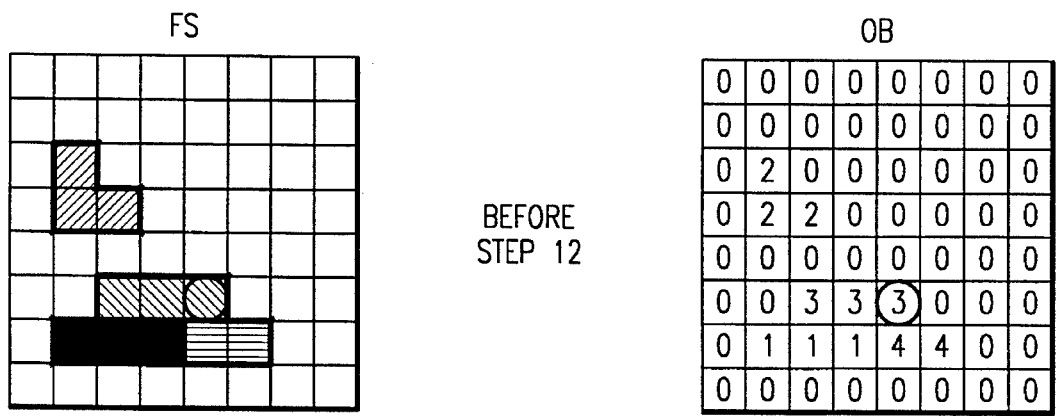
Figure 5C:
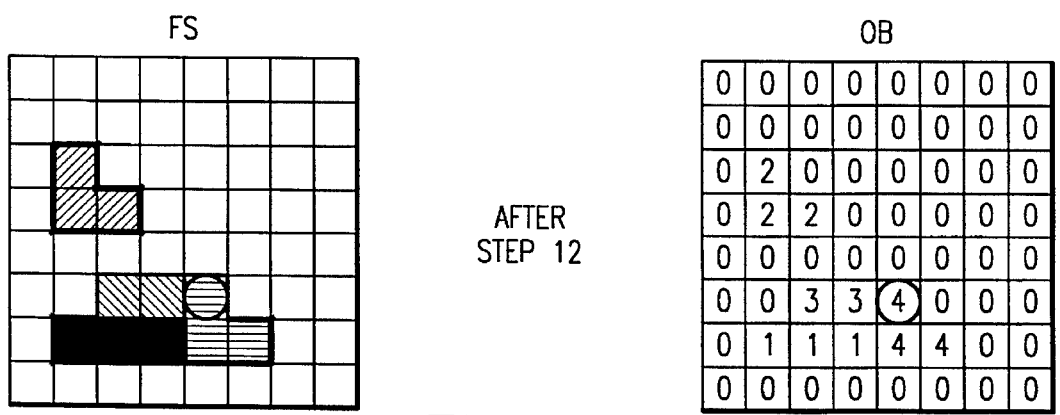

A table of example steps performed by the four processors PROC 0 to PROC 3 in carrying out the exemplary instructions "a" to "e" mentioned above is set out in FIG. 4, based on the assumption that, initially all of the pixels in the framestore FS are set to white colour, and a zero order number is stored in all of the locations in the ordering buffer OB, as shown in FIG. 5A. The table of FIG. 4 is self-explanatory. Points to note are that step 12 in the table is the first step where a processor (PROC 3, in this case) compares the order of the polygon it is executing with a current order CO (3) of the pixel (4, 2) under consideration which is not the cleared screen order of zero, because the pixel was previously written in step 11. In the case of step 12, the order of the polygon PO is 4, which is greater than the current order of 3, and therefore the pixel is written, as shown in FIGS. 5B and 5C. However, in the next step 13, the order of the polygon PO of I is not greater than the current order of 4 (produced in step 12), and therefore the pixel is not written in step 13. A further point to note is that, at steps 14 and 16, the processors PROC 1 and PROC 3 have completed rendering their current instructions b and d. Therefore, in step 18, processor PROC 1 commences performing the next instruction "e", and processor PP, OC 3 falls idle because there are no further instructions to be executed in the simple 5-instruction example which is given above.

Figure 2:
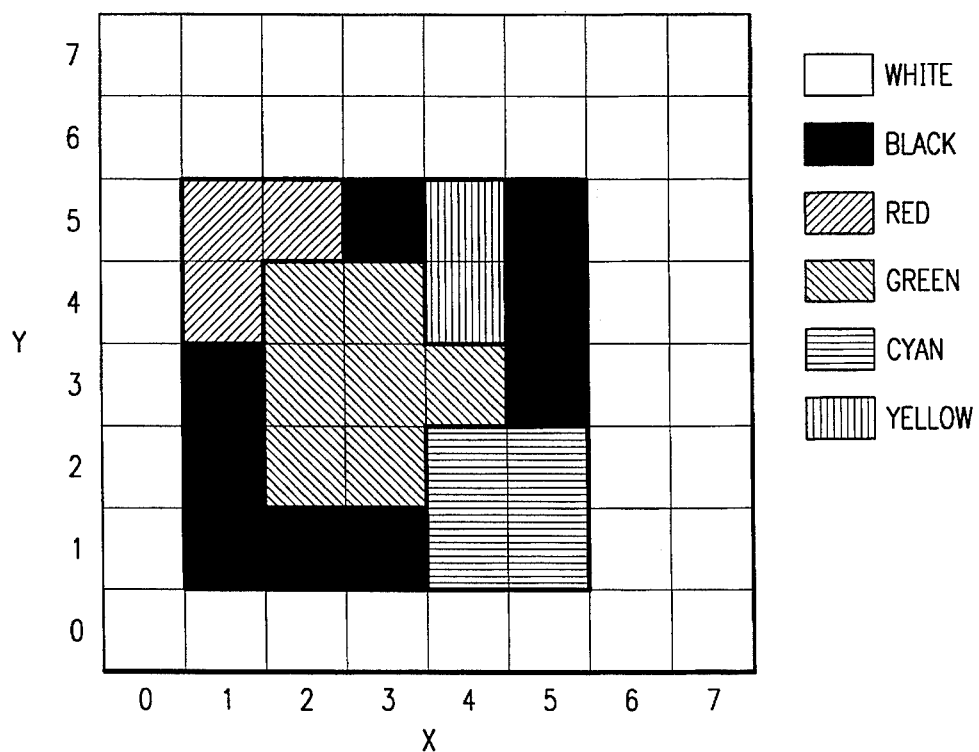
FIG. 2 illustrates an example content of the framestore.

It will be appreciated from a detailed consideration of FIG. 4 that after all of the steps 1 to 44 have been completed, the contents of the framestore FS will be as shown in FIG. 2.

For simplicity, the system has been described above as having an 8 ×8 word framestore FS and an 8×8 word ordering buffer OB. In practice, the framestore FS would have a far greater capacity than this, for example, 2k×2k words, and the output register OR would correspondingly have a capacity of 2k words. The framestore FS may conveniently be implemented using, for example, a conventional Hitachi video RAM. The ordering buffer OB has a word capacity equal to that of the framestore, and may be implemented by, for example, a conventional Hitachi D-RAM. Each word of the ordering buffer OB may consist of, for example, 16, 24 or 32 bits, which enable 65,535, 16,777,215 or 4,294,967,295 polygons, respectively, to be rendered before any overflow occurs in the ordering buffer.

In the case where the system is to be used to render a number of polygons sufficiently great to cause overflow in the ordering buffer, then the following procedure may be adopted in the preferred embodiment. The sequence of instructions to the instruction register IR is halted after the instruction having the maximum order number, for example order number 65535 in the 16-bit case. Then, when all of the instructions in the instruction register have been read and executed, the processors stop rendering. When all of the processors have stopped, the ordering buffer OB is cleared to zero, and then a further sequence of instructions is supplied to the instruction register, with the first instruction having an order number of 1. Accordingly, the processors recommence rendering, with the new sequence of instructions causing objects to be rendered which overwrite the previous contents of the framestore FS before the temporary halt in execution.

It will be appreciated that many modifications and developments may be made to the system described above. For example, any plural number of processors may be employed. Also, increasing significance of the rendering instructions may be denoted by decreasing, rather than increasing order numbers. Furthermore, the framestore FS and ordering buffer OB could be combined into a single device. For example, with a 32-bit framestore, 16 bits could be used to store the pixel data and 16 bits could be used to store the ordering data.

I claim:

1. A graphics rendering system, comprising:

a framestore providing an array of pixel locations;

means for supplying a set of rendering instructions, each related to a graphical shape to be rendered in the framestore and each comprising an opcode indicative of a type of rendering operations, parameters to be used in that rendering operation, and an ordering code;

a plurality of processors operating in parallel to receive such rendering instructions and to write pixels in the framestore to render the related graphical shape; and an ordering buffer having an array of memory cells each corresponding to a respective pixel location in the framestore;

wherein each processor, when determining whether to write a pixel at a pixel location in the framestore, is configured to write that respective pixel if and only if the ordering code of the graphical shape being rendered is more significant than the content of the memory cell in the buffer corresponding to that pixel, and when writing said pixel, to update that memory cell with the ordering code of the graphical shape being rendered.

2. A system as claimed in claim 1, wherein the framestore and the ordering buffer have a common address bus (AB).

3. A system as claimed in claim 1 wherein the framestore is provided by a video RAM and the ordering buffer is provided by a non-video RAM.

4. A system as claimed in claim 1 wherein the framestore and ordering buffer are provided by a common video RAM at each location of which the pixel data is stored by some bits and the corresponding ordering code is stored by other bits.

5. A system as claimed in claim 1, which upon overflow of the ordering codes of the supplied instructions, is configured to halt temporarily the supply of instructions, to permit the processors to complete the previously supplied instructions, and to reset the ordering buffer.

* * * * *